United States Patent [19]

Piteo

[11] Patent Number: 4,487,191

[45] Date of Patent: Dec. 11, 1984

[54] SOLID STATE IGNITION SYSTEM HAVING DRIFT-FREE TIMING

[75] Inventor: Michael J. Piteo, Enfield, Conn.

[73] Assignee: R. E. Phelon Company, Inc., East Longmeadow, Mass.

[21] Appl. No.: 550,788

[22] Filed: Nov. 14, 1983

[51] Int. Cl.³ .............................................. F02P 3/04
[52] U.S. Cl. ................................ 123/652; 123/149 C
[58] Field of Search ........... 123/149 R, 149 A, 149 C, 123/149 D, 418, 599, 602, 651, 652

[56] References Cited

U.S. PATENT DOCUMENTS 3,484,677  12/1969  Piteo .............................. 123/652 X
3,878,452   4/1975  Haubner et al. ................. 123/651 X
4,120,277  10/1978  Ehlen ........................... 123/149 D X

FOREIGN PATENT DOCUMENTS 161961  12/1980  Japan ................................. 123/599
161962  12/1980  Japan ................................. 123/599

Primary Examiner—Tony M. Argenbright
Attorney, Agent, or Firm—Chapin, Neal & Dempsey

[57] ABSTRACT

This application discloses a solid state ignition system of the inductive type and includes a trigger coil and an ignition coil having primary and secondary windings disposed on a stator core. A flux generating magnet is carried by a rotor to induce voltages in the coils. A Darlington transistor is disposed in circuit with the primary winding of the ignition coil with the collector emitter electrodes of the transistor connected to carry current generated in the primary of the ignition coil. The base of the transistor is connected to receive current pulses generated in the trigger coil. A parallel capacitor and resistor network is connected in circuit between the trigger coil and the base of the Darlington transistor. The capacitance of said capacitor and the resistance of the resistor are selected so that the retard angle of said system from low-to-high rotational speed of the flux generating magnet remains essentially constant.

3 Claims, 6 Drawing Figures

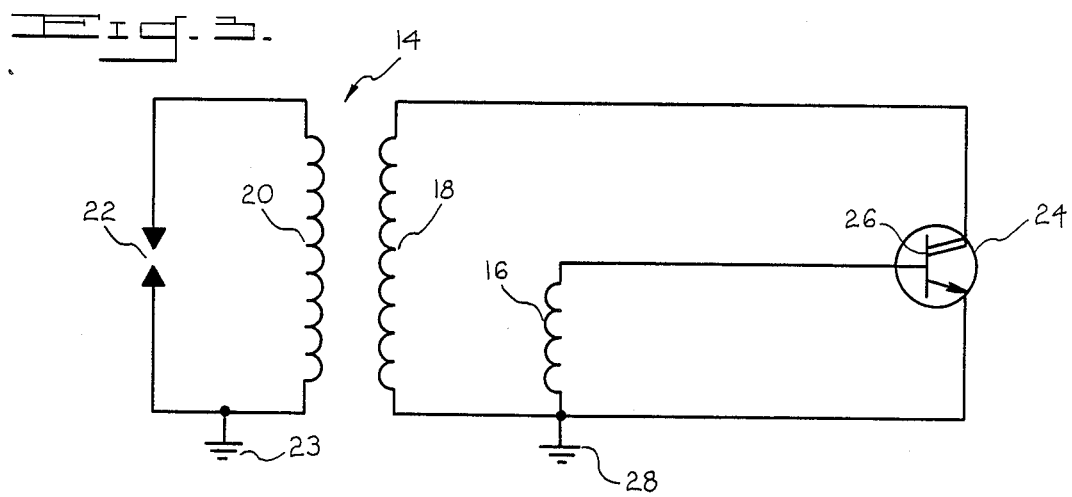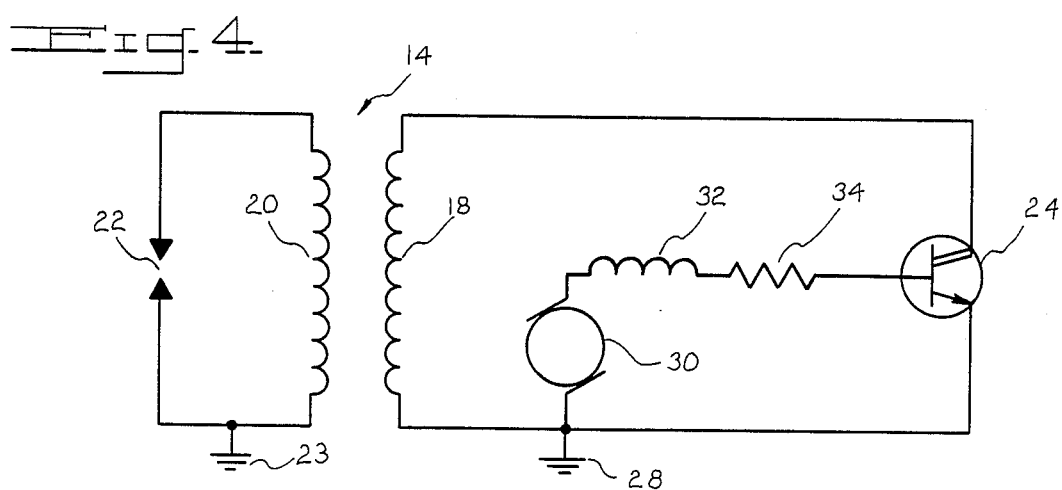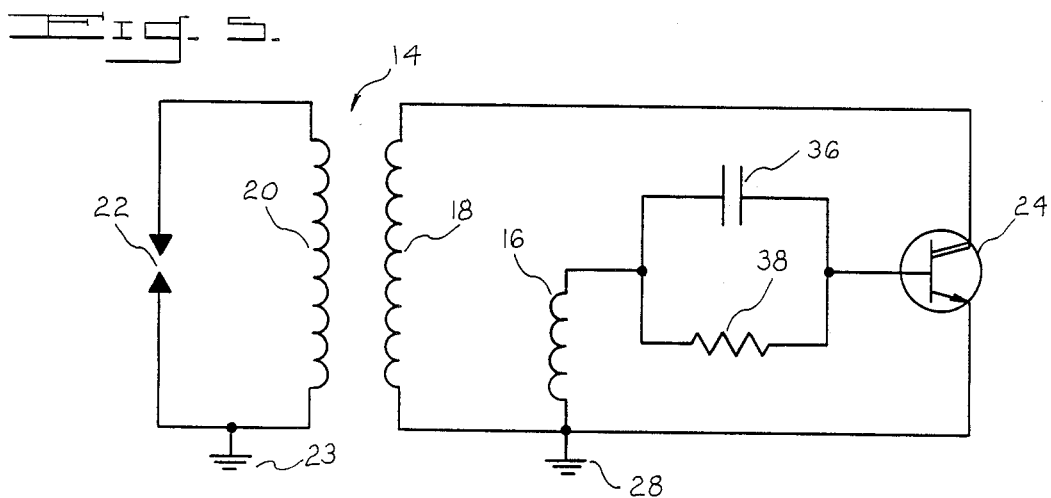

SOLID STATE IGNITION SYSTEM HAVING DRIFT-FREE TIMING

BACKGROUND OF THE INVENTION

This invention relates to breakerless ignition systems for internal combustion engines which are generally of the inductive type, such as disclosed in Piteo U.S. Pat. No. 3,484,677. One of the drawbacks heretofore associated with such solid state inductive circuits is leakage flux which causes undesirable timing shifts over the speed range of the system. This problem arises at increasing engine rpm because inductive reactance ($X_L$) is directly proportional to frequency and thus, the speed of rotation of the flux generating magnet.

It is the principal object of this invention to provide an inductive ignition system for an internal combustion engine having a trigger coil and a solid state switching means in which the problem of timing shifts caused by the inductive reactance of said trigger coil over the operating speed range of the system is virtually eliminated.

Another object of this invention is to provide a simple and economical inductive ignition system of the above type in which ignition pulses occur at substantially the same angular position of the rotor throughout the operating speed of the system.

A still further object of this invention is to provide an inductive ignition system of the above type in which stable timing is achieved by the use of simple and economical electrical components in circuit with the trigger coil and switching means, said components having predetermined values of capacitance and resistance to compensate for the increasing inductive reactance of the trigger coil at increasing engine rpm.

The above and other objects and advantages of this invention will be more readily apparent from the following description read in conjunction with the accompanying drawing in which:

FIGS. 1(a) and 1(b) are elevational views of an ignition system of the type embodying this invention with components thereof in different operative conditions;

FIG. 3 is a schematic wiring diagram illustrative of one type of inductive ignition system;

FIG. 4 is a schematic wiring diagram of the FIG. 3 circuit in which one of the components has been replaced by equivalent electrical components, and FIG. 5 is a schematic wiring diagram of a system embodying this invention.

Figure 1:
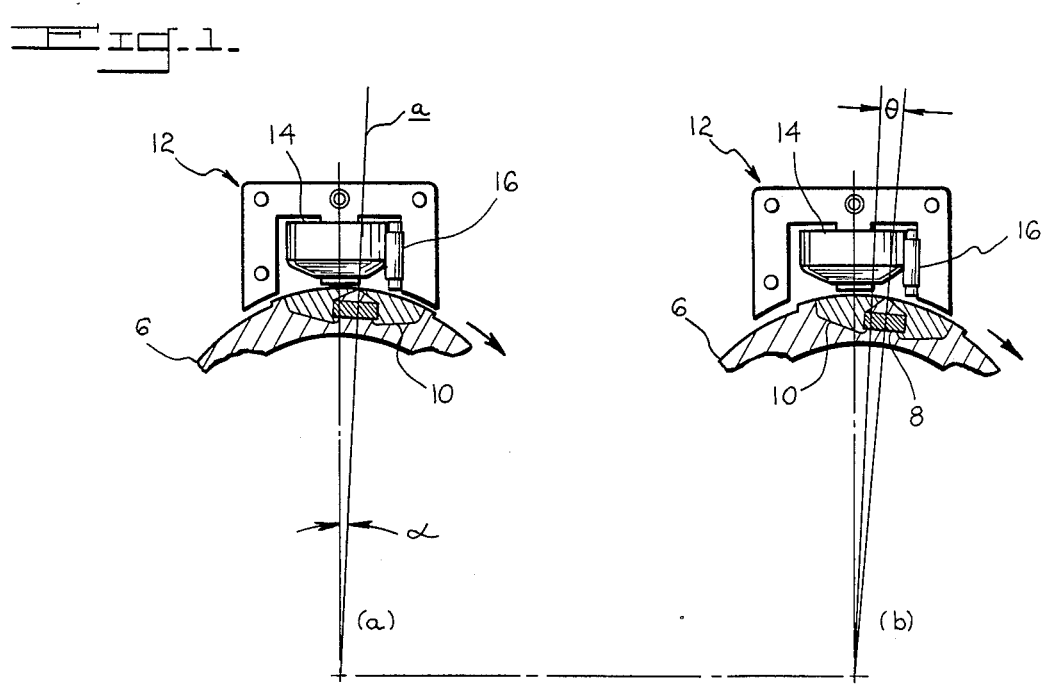

Referring in detail to the drawing in FIG. 1, is illustrated an ignition system of the type embodying this invention. The system includes a rotor, such as a flywheel 6 which is rotated by an internal combustion engine, not shown. A permanent magnet 8 and a pair of pole shoes 10, in contact with the magnet, are mounted in the rim of the flywheel and provide the magnetic flux which generates voltage pulses in the coils mounted on a stator core 12 when the magnet poles rotate past the core. In the embodiment shown, the arrow illustrates clockwise rotation of the flywheel 6.

As shown, the core 12 includes three spaced, generally parallel legs and is preferably of laminated ferromagnetic construction. A transformer or ignition coil 14 is disposed on the center leg of the core 12 and includes primary coil 18 and secondary coil 20 (FIG. 3). A trigger coil 16 is disposed at a predetermined position between the center and the trailing leg of the core 12 and is preferably wound on a small ferromagnetic core and has sufficient turns, on the order of 1,000–1,500, to cause a high gain Darlington transistor to be turned "on" even though the output of the coil is transmitted through an RC phase correcting network, as will hereinafter be described in connection with FIG. 5. The position of the trigger coil is such that a trigger pulse will be generated in synchronization with the voltage induced in the primary coil 18.

In FIG. 3 a conventional type of inductive ignition system is illustrated in which the ignition coil 14 includes the primary and secondary coils 18 and 20 with a spark plug 22 connected across the secondary coil 20 and a ground connection, as illustrated at 23. A Darlington transistor 24 has its collector and emitter electrodes connected to opposite ends of the primary coil 18. The collector and emitter path of the Darlington transistor provides a low impedance path for the current generated in the primary coil. The base electrode 26 of the transistor 24 is shown connected to one end of the trigger coil 16, the other end of the coil being connected to ground potential as represented at 28. As the magnet means, consisting of the permanent magnet 8 and the pole shoes 10, rotate past the core 12, the build up of magnetic flux in the core induces voltages in primary coil 18 (FIG. 3) of the transformer 14. Similarly, a voltage is induced in the trigger coil 16 and as the trigger voltage increases, transistor 24 (FIG. 3) is biased "on" by the base-emitter current so that a low impedance path is provided for primary current through the collector-emitter junction of transistor 24. Because of its physical location, as the trigger voltage, seen by the base of the transistor, completes each half cycle, the transistor 24 is turned "off" and the resulting collapse of current flow in the primary coil of the circuit causes an ignition pulse to be induced in the secondary coil 20 of the transformer.

At low rotational speed (rpm), ignition occurs at a predetermined position of the pole shoes relative to the core legs which is known as "zero edge distance." This position is illustrated in FIG. 1(a) of the drawings by a radially line a extending from the center of rotation of the flywheel 6 to a point of tangency to the trailing edge of the "leading" pole shoe with respect to its direction of rotation relative to the core. This radial line a forms a reference angle $\alpha$ (FIG. 1(a)) in relation to the top dead center position of the rotor. In FIG. 1(b), the ignition system is illustrated when operating at substantially higher rpm than in FIG. 1(a). The result is that the ignition pulse now occurs at an angle $\theta$ which is substantially offset from the angular position of the rotor at "zero edge distance." This offset from "zero edge distance" forms an angle known as "the retard angle." With an inductive ignition system of this type, there is a substantial and undesirable timing shift as the engine varies over its speed range.

Figure 2:
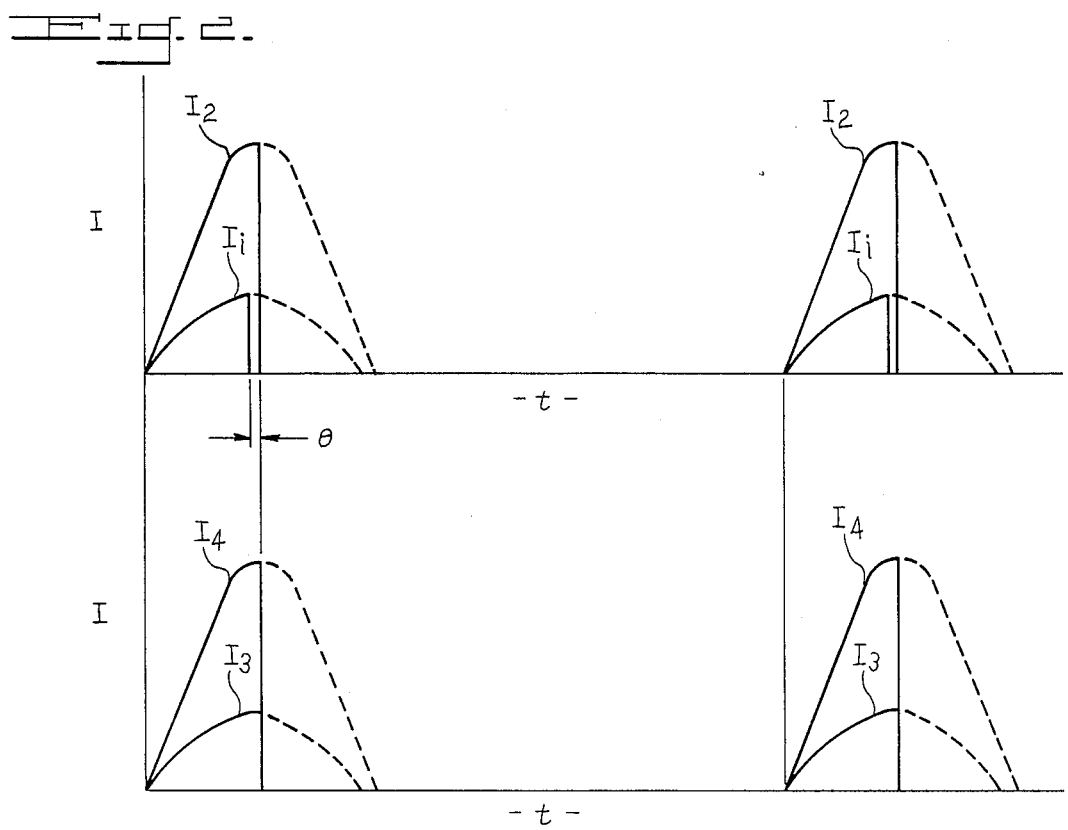
FIG. 2 illustrates the wave shapes of ignition pulses generated in the system embodying this invention and for a previously available system.

In FIG. 2, two sets of current pulses are illustrated. In the upper set of wave shapes $I_1$ represents the positive half wave pulses induced in the ignition coil primary at low rpm, such as at 300 rpm, for example, and $I_2$ represents the current induced at about 3,000 rpm. It will be noted that the amplitude of peak current at high rpm measured along the ordinate of these curves occurs at a later time as measured along the abscissa of the curves. This offset is designated by the angle $\theta$ which corresponds to the retard angle at higher rpm, also illustrated in FIG. 1(b). In the lower set of wave shapes shown in FIG. 2, the same type of current pulses are illustrated and these are designated $I_3$ for 300 rpm operating speed and $I_4$ for 3,000 rpm. In this instance, the peak current at both high and low rpm occurs at the same physical location of the magnet means relative to the coil group. In other words, the retard angle $\theta$ has been virtually eliminated and these wave shapes are representative of the operation of an ignition system of the type embodying this invention, shown in FIG. 5.

FIG. 4 constitutes a representation of FIG. 3 but the trigger coil 16 is replaced by functionally equivalent electrical components, that is flux generator 30, and in series with the generator, inductance 32 and resistor 34. A trigger coil, such as shown at 16, having 1,500 turns of number 34 wire wound on an iron core has an inductance of about 0.04 Henries and a resistance of about 125 ohms. Thus, the inductance and resistance of the trigger coil 16 can be accurately represented by equivalent electrical elements 32 and 34 having these values. At low rotor speed of about 300 rpm, rise time of the trigger coil, as measured on an oscilloscope for this circuit is 8.3 ms.

Since rise time is equal to one-quarter the time for a complete cycle of voltage generated during one revolution of the rotor 6, the frequency in Hertz for this system at 300 rpm would be $$\frac{1}{4 \times 8.3 ms} = \frac{1000}{33.2} = 30.12$$

or about 30 Hertz.

The frequency at 3,000 rpm was similarly calculated at about 300 Hertz.

Retard angles for each of these two frequencies are determined as follows:

at 300 rpm; $\theta = \tan^{-1} = \frac{2\pi f L}{R} =$ $$\frac{6.28 \times 30 \times .04}{125} = .06 = 3.45°$$

at 3,000 rpm; $\theta = \tan^{-1} = \frac{6.28 \times 300 \times 0.4}{125} = .6 = 30°$ In an ignition system in which the rotor is 5 inches in diameter, for all practical purposes, a retard angle of 3.45° amounts to a mechanical retard of less tha one degree and at 30°, it amounts to a mechanical retard of about 5°.

In order to eliminate this retard at higher rpm, as shown in FIG. 5, a capacitor 36 and resistor 38 in parallel with the capacitor, as shown in FIG. 5, are added between the trigger coil 16 and the base electrode 26 of the Darlington transistor 24. The trigger coil 16 has sufficient turns on the order of 1,000 to 1,500 to cause a high gain Darlington transistor to be turned "on" even though the output of the coil 16 is connected to the base of the transistor through an RC phase correcting network. The Darlington transistor 24 is preferably a high gain transistor, such as 1,000 gain at 1 amp of current flow. The values of capacitor 36 and resistor 38 required to virtually eliminate the retard angle $\theta$ as the rotor speed varies over its operating range, e.g. 300 to 3,000 rpm, may be determined as follows:

For a parallel R/C network at 300 rpm:

$$\theta = \tan^{-1} WRC = 2\pi f RC = \tan^{-1} 6.28 \times 300 \times RC =$$

$$.6 RC = \frac{.6}{300 \times 6.28} = .0032$$

This number represents the product of capacitance in $\mu f$ and resistance in ohms. Thus, if the value of the capacitor 36 is selected at 0.1 $\mu f$, the resistor 38 would be about 3200 106 . For purposes of this invention, the capacitor may vary from approximately 1.0 to 0.1 $\mu f$ and the resistor from about 320 to 3200 ohms. These values of capacitance and resistance in a parallel circuit provide a tuned circuit in which the current lag caused by the inductive reactance of the trigger coil 16 is offset by the capacitive reactance of capacitor 36.

It is important in this circuit to select a trigger coil with enough generating capacity, e.g. 1,000 to 1,500 turns to turn "on" the high gain Darlington transistor 24, and a Q value which enables tuning over the operating speed range of the system with a capacitor 36 within practical range of capacitance values. Also, the value of resistor 38 must be high enough to be effective in the tuning of $X_c$ and $X_L$ but low enough to provide a bleed path of moderate impedance for discharging the capacitor 36, since the base-to-emitter path of the Darlington transistor allows conduction in one direction only.

Having thus disclosed this invention, what is claimed is:

1. Breakerless inductive ignition system comprising a stator including a ferromagnetic core, an ignition coil disposed on said core and having primary and secondary windings magnetically coupled for transformer action, a rotor with magnet means carried thereby for inducing flux generated voltages in the primary winding of said ignition coil as the magnet means rotates past said core, a Darlington transistor having collector, emitter and base electrodes, circuit means interconnecting the collector and emitter electrodes of the Darlington transistor to the opposite ends of said primary winding, said stator including a trigger coil, a capacitor and resistor in parallel and being connected to one end of the trigger coil and the base of said transistor, the capacitance of said capacitor and the resistance of said resistor being selected to eliminate the retard angle resulting from the inductive reactance of said trigger coil.

2. Breakerless inductive ignition system as set forth in claim 1, in which said trigger coil has approximately 1,000 to 1,500 turns and in which said transistor is a high-gain transistor.

3. Breakerless inductive ignition system as set forth in claim 2, in which said capacitor has a capacitance of 1.0 to 0.1 microfarads and said resistor has a resistance of about 320 to 3200 ohms.

* * * * *